US012370558B1

(12) United States Patent
Song

(10) Patent No.: US 12,370,558 B1
(45) Date of Patent: Jul. 29, 2025

(54) SYSTEM AND APPARATUS FOR REMOVING MAGNETIC PARTICLES FROM A MOVING HVAC AIR STREAM

(71) Applicant: Government of the United States, as represented by the Secretary of the Air Force, Wright-Patterson AFB, OH (US)

(72) Inventor: Bill Song, Ellicott City, MD (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 464 days.

(21) Appl. No.: 17/891,531

(22) Filed: Aug. 19, 2022

(51) Int. Cl.
*B03C 1/12* (2006.01)

(52) U.S. Cl.
CPC ............ *B03C 1/12* (2013.01); *B03C 2201/20* (2013.01)

(58) Field of Classification Search
CPC ...... B03C 1/0332; B03C 1/0335; B03C 1/035
See application file for complete search history.

(56) References Cited

U.S. PATENT DOCUMENTS

| | | | | |
|---|---|---|---|---|
| 5,481,983 | A | 1/1996 | Guzman | |
| 5,879,549 | A | 3/1999 | Caiozza | |
| 6,743,365 | B1 * | 6/2004 | Marlowe | B01D 35/06 210/695 |
| 7,183,104 | B1 | 2/2007 | Megerle | |
| 8,584,293 | B1 * | 11/2013 | Arnal | A47L 23/22 15/112 |
| 2002/0053283 | A1 | 5/2002 | Akyildiz | |
| 2019/0226169 | A1 | 7/2019 | Hopwood | |

* cited by examiner

*Primary Examiner* — Sharon Pregler
(74) *Attorney, Agent, or Firm* — AFMCLO/JAZ; Larry L. Huston

(57) ABSTRACT

A system for removing magnetic particles from a moving air stream. The system has magnetic collectors disposed in the air stream. The collectors may comprise mutually parallel motor driven rollers spaced which interact with the moving air stream. The rollers are optionally grooved or finned to provide for accumulation of collected particles. The rollers are in real time communication with a data hub. The data hub receives static and dynamic air handler performance parameters to monitor the performance parameters of the system which are indicative of and quantitatively relatable to debris accumulation on the rollers. When a threshold air handler performance parameter value is reached, the data hub alerts an operator for maintenance and restoration of the system.

20 Claims, 13 Drawing Sheets

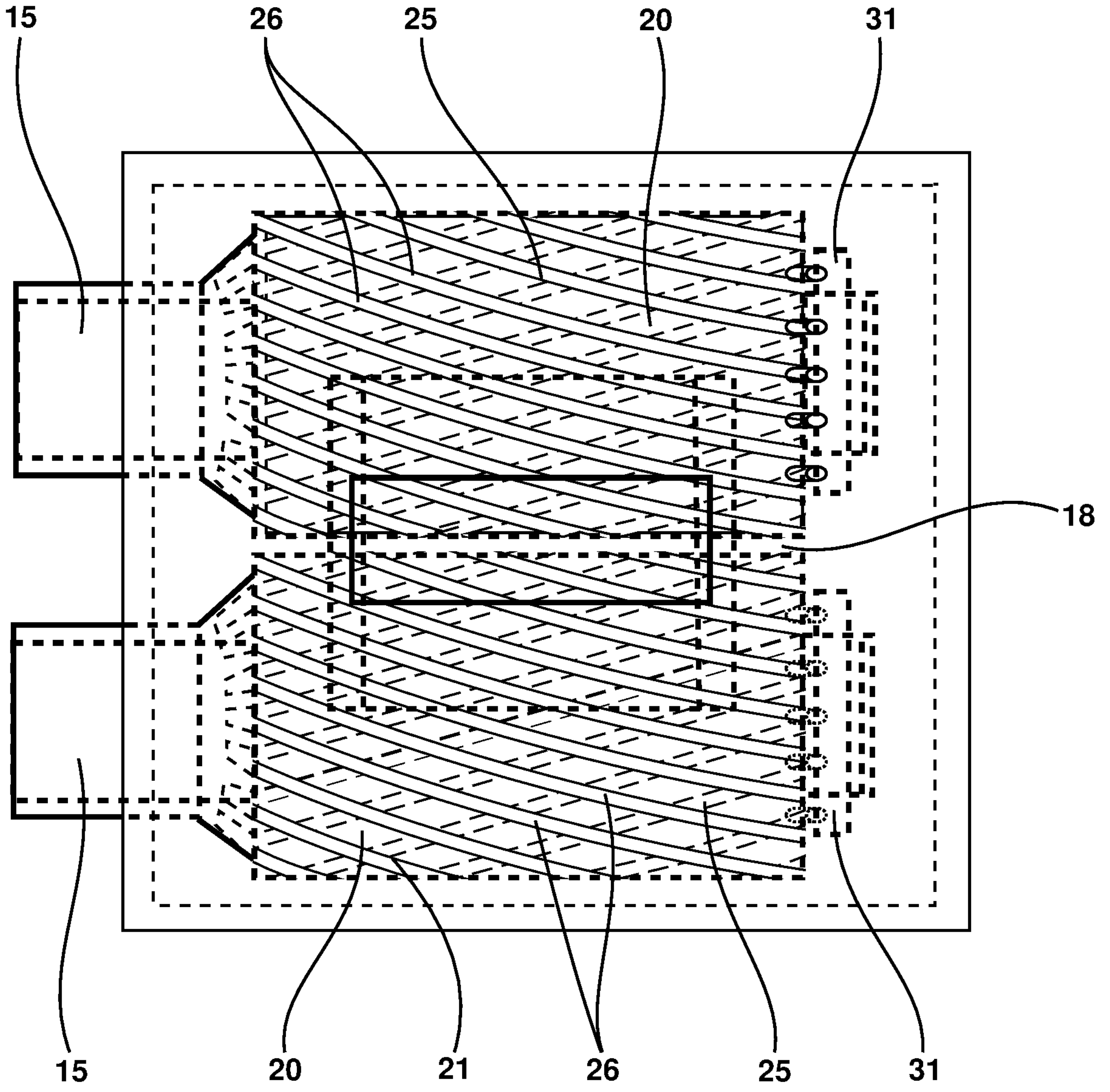
FIG. 3A1

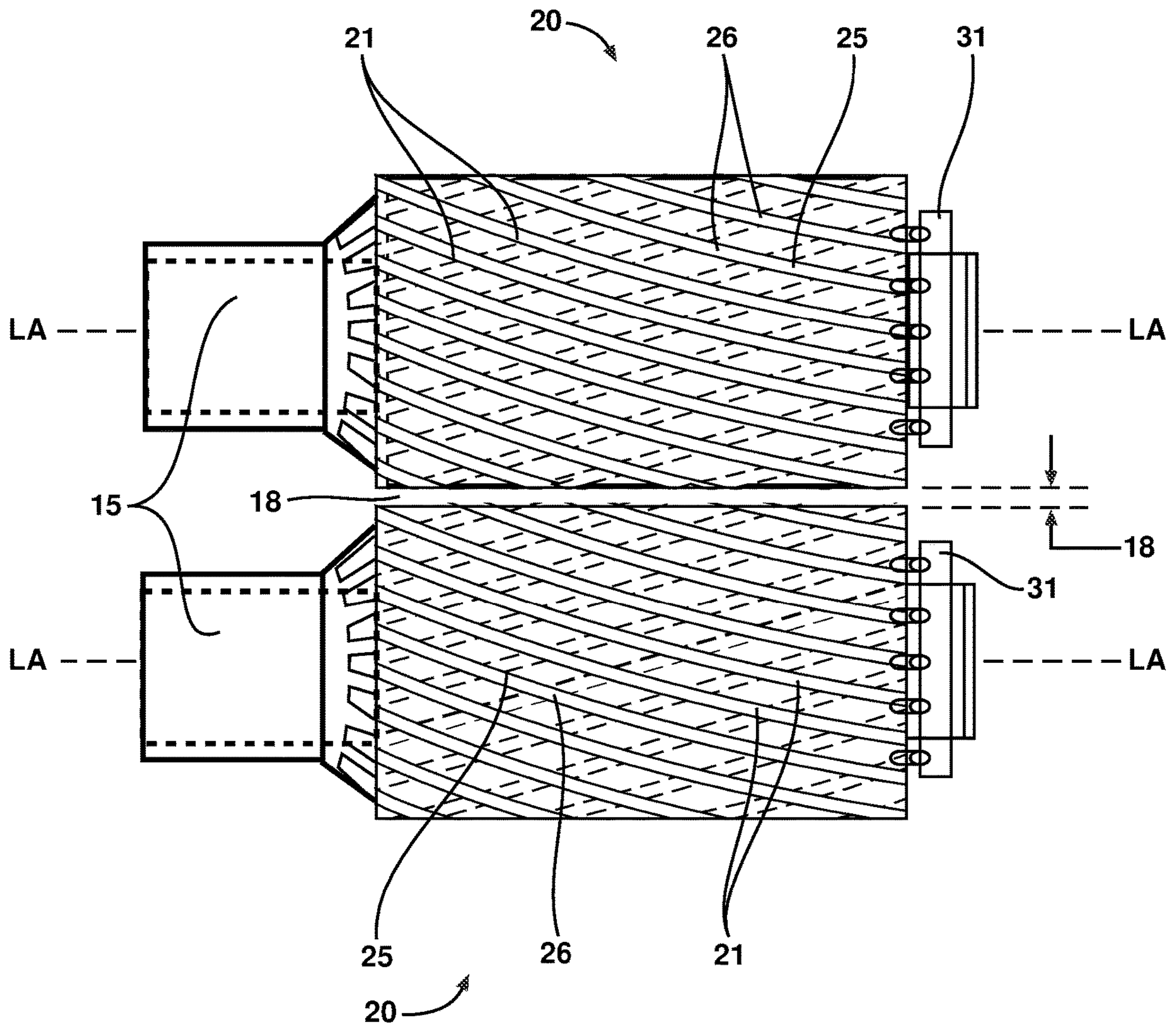
FIG. 3A2

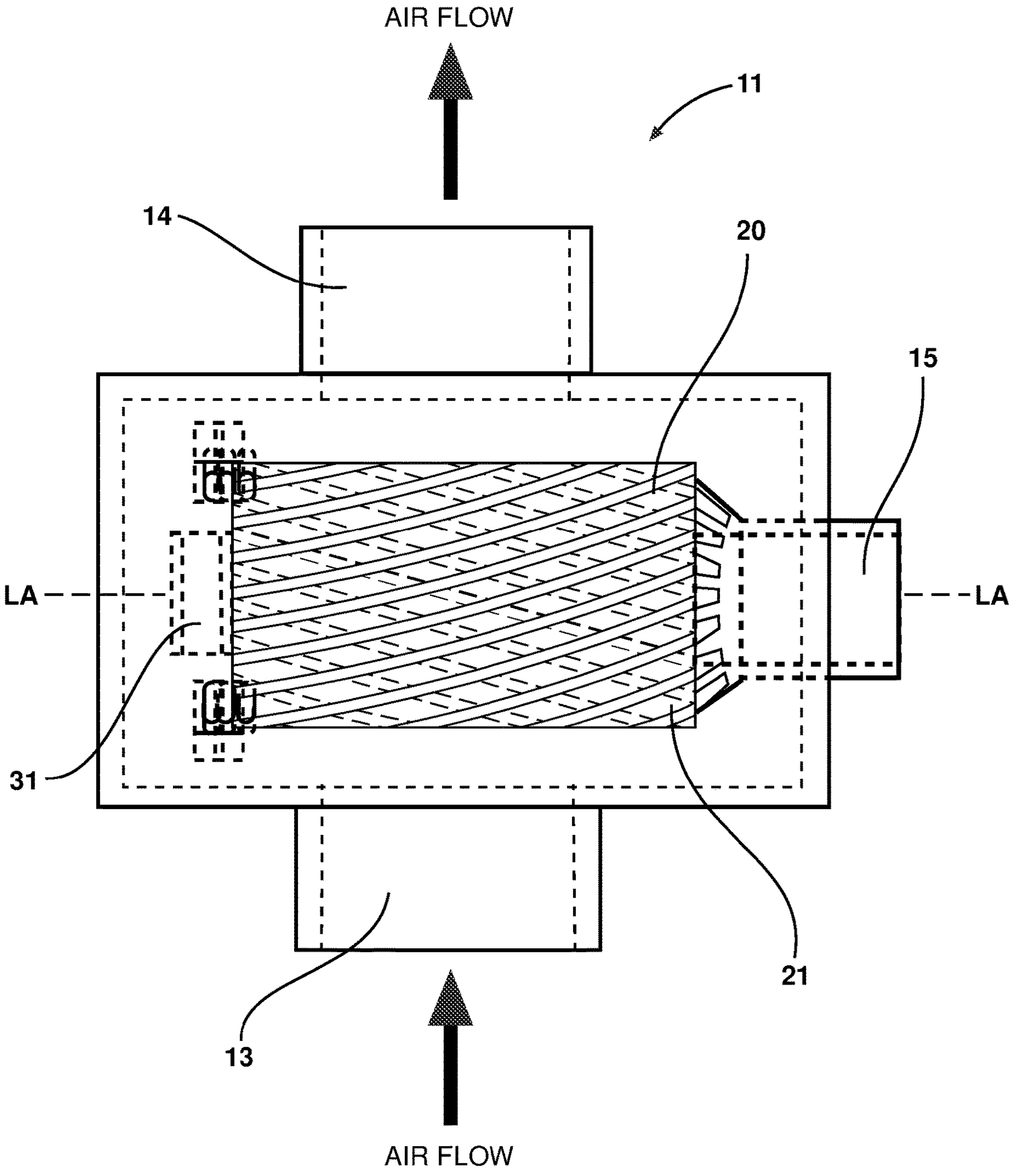
FIG. 3B1

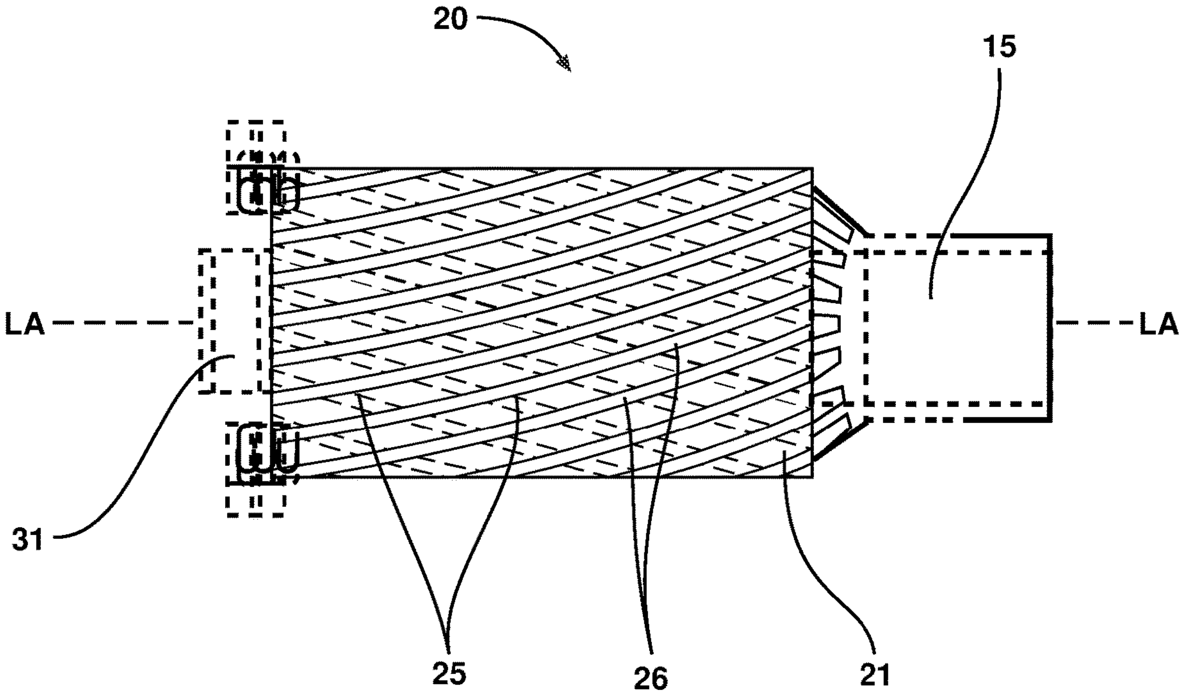
FIG. 3B2

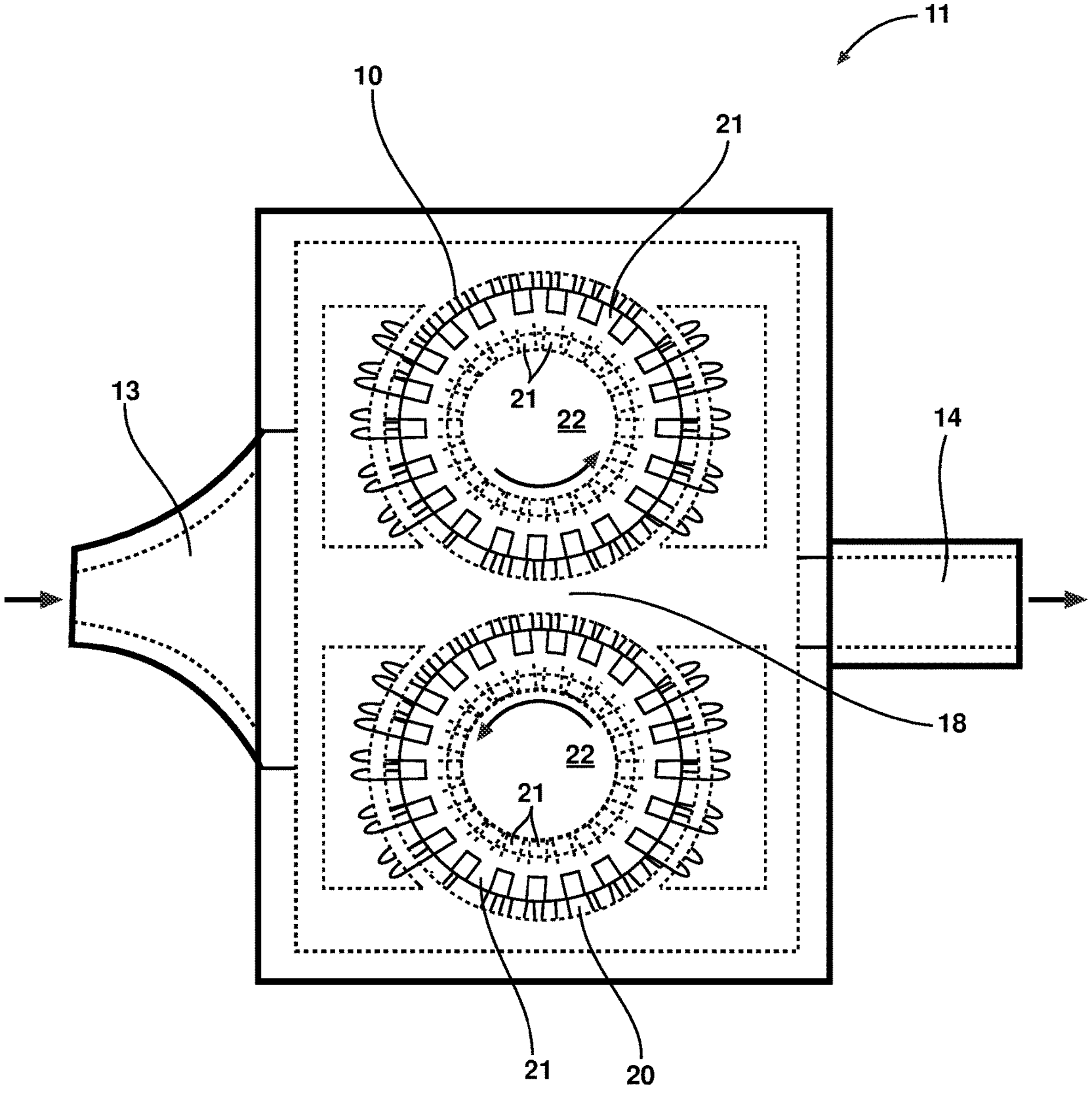
FIG. 3C1

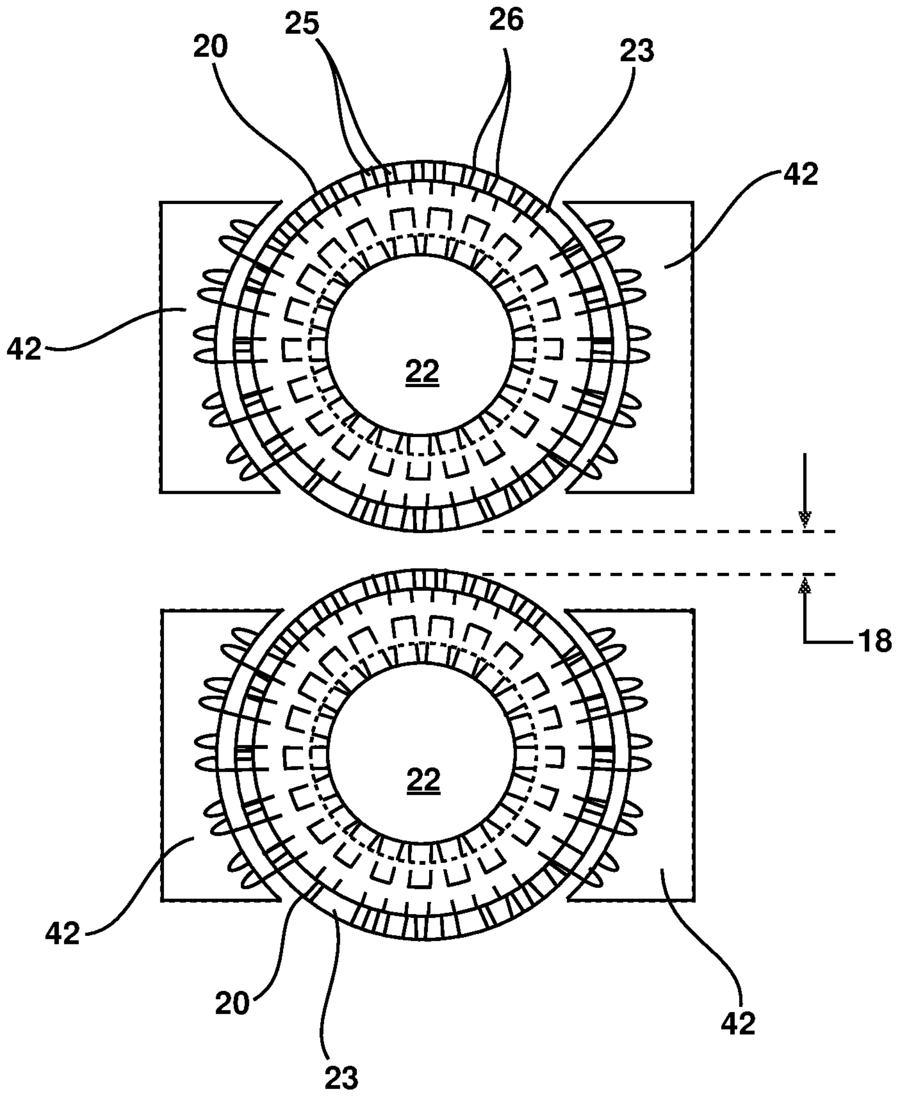
FIG. 3C2

SYSTEM AND APPARATUS FOR REMOVING MAGNETIC PARTICLES FROM A MOVING HVAC AIR STREAM

STATEMENT OF GOVERNMENT INTEREST

The invention described and claimed herein may be manufactured and used by or for the Government of the United States of America for all government purposes without the payment of any royalty.

FIELD OF THE INVENTION

The present invention is related to a system for removing magnetic particles from a moving air stream and more particularly to such a system which dynamically responds to changing conditions with an externally discernable indicium.

BACKGROUND OF THE INVENTION

Forward deployment in a hostile environment often requires use of small, deployable or locally built containers to house personnel for managing operations during the deployment, house personnel for sleeping, eating and for other functions. The containers may have a volume of approximately 30 to 50 cubic meters having minimal heating, ventilation and air condition [HVAC] capability.

In such small environments, the limited HVAC capability may not allow for adequate air scrubbing to remove small particles which can be injurious to skin or inhaled. Airborne metallic particles can be particularly harmful. For example, inhalation of toxic metallic particles can be particularly dangerous. Attempts to overcome this problem include using personal protective equipment to filter air before inhalation. But personal protective equipment may be uncomfortable over long periods or infeasible during meals and other tasks. Furthermore, magnetic metallic powder accumulation can lead to explosion hazards which cannot be addressed by personal protective equipment. Complex HVAC equipment may be infeasible during forward deployment as requiring too much oversight and attendant complex training.

Accordingly a new approach is needed. A simple system which can autonomously indicate when maintenance is required due to accumulation of magnetic particles, can have a modular construction to minimize assembly time and is relatively simple operate is proposed.

SUMMARY OF THE INVENTION

In one embodiment the invention comprises a system for removing magnetic particles from a moving air stream. The system comprises an air handler having an inlet and an outlet for directing an air stream therethrough, the air stream having a plurality of magnetic particles entrained therein, at least one magnet disposed internal to said air handler to interact with the air stream in order to remove magnetic particles therefrom, a motor to impart rotational movement to the magnet during operation, at least one air handler performance parameter sensor operably connected the at least one magnet for gathering data from air handler performance parameters selected from the group consisting of weight, current, voltage, torque and temperature and combinations thereof and a data hub operably connected to each air handler performance parameter sensor, the data hub being capable of determining a respective change in value of each parameter responsive to and quantitatively indicative of accumulation of magnetic particles on that magnet and being capable of reporting a change in that value to an operator.

BRIEF DESCRIPTION OF THE DRAWINGS

FIG. 3A1 is a scale vertical sectional view of the air handler of FIG. 2B, taken along line 3A1-3A1.

FIG. 3A2 is a frontal elevational view of the rollers of FIGS. 2A and 2B.

FIGS. 3B1 and 3B2 are scale top plan views of the air handler and rollers of FIGS. 2 and 2B, respectively, the top of the air handler being omitted for clarity.

FIGS. 3C1 and 3C2 are scale side elevational views of the apparatus and rollers of FIG. 2, respectively, the side of the air handler being omitted for clarity.

DETAILED DESCRIPTION OF THE INVENTION

Figure 1:
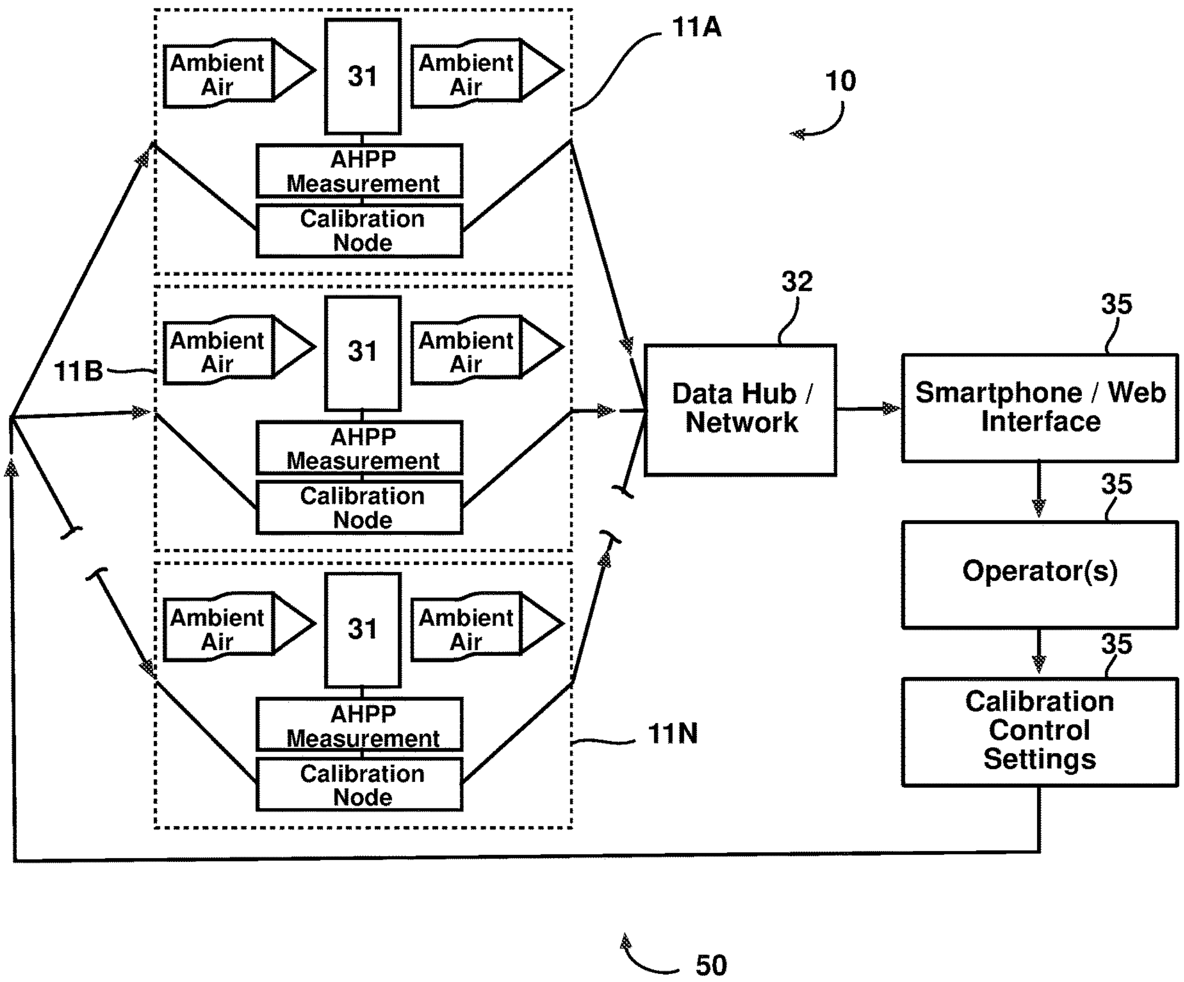
FIG. 1 is a block diagram of a closed loop feedback system according to the present invention.

Referring to FIG. 1, a system 10 according to the present invention comprises an air handler 11 having an air flow chamber having an inlet 13 and outlet 14, at least one magnet 21 therein, a scale operably associated with the magnet 21, an alarm 33 in communication with the scale and a data hub 32 for operational control. The air flow chamber may be disposed inside or outside a container which houses personnel during forward deployment. Each container may have one or more systems 10 according to the present invention. A system 10 may service plural containers or preferably is dedicated to a single container.

The air chambers have at least one magnet 21, and preferably two or more magnets 21, disposed therein for accumulation of particles from the air flow. Preferably the air flow is directed between the magnets 21 for improved accumulation of metallic particles from the air stream. The magnets 21 may have a strength of about 100 Gauss to about 15,000 Gauss and more particularly about one tesla. Associated with each magnet 21 is a calibration node to maintain consistent operation. The magnets 21 may be shaped as and function as rollers 20, as discussed below. If desired, the magnet 21 may be used as a solid roller 20 or a magnet 21 may be inserted into a hollow magnetic steel core 22 of a roller 20.

Examining the invention in more detail, the system 10 comprises one or more air chambers which may be disposed in series or in parallel. Each air chamber has an inlet 13 and an outlet 14 for ingestion of air and removal of air flow, respectively. Each air chamber may have a width of 10-25 cm. Such an arrangement is believed to be suitable for an arrangement having two rollers 20 with a width, taken in the longitudinal direction, of 12 cm to 18 cm, particularly about 15 cm and a gap 18 between the rollers 20 of 2 cm to 4 cm, particularly about 3 cm.

The motor 15 for each magnet 21 is preferably digitally controllable through a microcontroller to the data hub 32 and user terminal. This arrangement allows the user to remotely control the direction and speed of the motor 15. The user terminal may have a graphic user interface 35 with web connectivity and functionality for remote use and control. An HTML-based or android/iOS based app for the remote user interface 35 display is believed to be suitable.

The data hub 32 is associated with at least one air handler 11, and preferably more than one air handler 11A, 11B, . . . 11N, to monitor operations and initiate one or more alarms 33 as needed. As discussed below the data hub 32 may monitor, record and send alarm signals qualitatively or quantitatively related to the weight of the rollers 20, the voltage draw used to axially rotate the rollers 20, the current draw of the motor 15, the torque necessary to axially rotate the rollers 20, the increased operational temperature of the roller bearings or motor bearings and combinations thereof and referred to herein as air handler 11 performance parameters (AHPP). The AHPP are measured by one or more air handler 11 performance parameter sensors (AHPPS) 31.

The air handler 11 performance parameters also include a static air handler 11 performance parameter of roller 20 weight, i.e. considered static as the weight is the same whether the roller 20 is rotating, i.e. in operation, or not. The air handler 11 performance parameters of voltage draw, current draw, torque and bearing temperature are herein referred to as dynamic performance parameters, as the measurements are only made while the rollers 20 are rotating and as if in operation. Prophetically vibration could be used for the AHPP.

The data hub 32 preferably has performance specifications similar to server-based machines such as Intel-based processor systems or a RaspberryPi with 1.5 GHZ, 4 GB of SDRAM, and Bluetooth/Ethernet connectivity. Each motor 15 on the preferably has a dedicated electronic control unit (ECU) comprised of the motor 15 and a voltage sensing device linked to the data hub 32. The data hub 32 is usable with all of the air handler 11 performance parameter sensors 31 described and claimed herein.

In a first embodiment, a voltage sensing device is used as the AHPPS. The voltage sensor 31 measures the voltage drawn by the motor 15 to operate one or more rollers 20 having a clean magnet 21 free of particles during steady state operation. This value for the voltage is used as a null point, or more specifically a null voltage, to reference a delta or relative increase in voltage draw by the motor 15 due to the accumulation of magnetic particles. In this manner, the voltage sensor 31 quantitatively measures particle accumulation on the magnet 21. For example, a spike in voltage or no increase in signal during operation would indicate a jam or operational fault. A steady increase in the voltage drawn from the motor 15 due to the accumulation of particles on the magnet 21 represents load sensing through monitoring the voltage.

Once a predetermined voltage threshold is reached, the electronic control unit sends a signal to the data hub 32 alerting the user that cleaning or related maintenance is required. The voltage sensor 31 is tailored to the size and operating conditions of the magnet 21. Prophetically a voltage detection module having a sensor 31 with a range of 0-25 V and a resolution of at least 0.01 mV, such as a Due or a Pro Mini Board, available from Arduino of Somerville, MA is believed to be suitable. The voltage detection module, and modules for other dynamic air handler 11 performance parameter sensors 31, may send data to the hub 32 at frequencies of 10 Hz to 100 Hz and typically at frequencies of 10-20 Hz.

The voltage data in the hub 32 may be processed through one or more filters, to account for natural fluctuations during operation and to provide noise cancellation. This filter prophetically reduces false alarm 33 readings before the data are reported to the user via the user interface 35. The data hub 32 may send a notification to the user interface 35 on a website, a phone, dedicated alarm 33 station or other suitable audible and/or visual output. Using Bluetooth, web or similar connectivity, the user interface 35 could be hosted locally on an intranet system or hosted by a cloud service provider. In one exemplary embodiment, the safety display may have one, two, three or more lights, with each light having solid or blinking functionality indicating the status of the operations. Additionally or alternatively, the system 10 may have one or more audible tones as indicia for errors or emergency codes.

The signal preferably alerts a safety display or other indicium thereby indicating that action is called for. The safety display may indicate that maintenance is soon to be called for or is necessary now. The signal may be qualitative or quantitative, as desired. The signal is calibrated to the specific air chamber, debris and/or air flow volume under consideration via the data hub 32 and input controls in the user interface 35. If a change in air flow conditions, such as flow rate, duct geometry or desired alarm 33 level occurs, the data hub 32 may be recalibrated. Furthermore different ducts, different metallic debris entrained in the air flow, different personnel needs may dictate recalibration of a particular air chamber/magnet 21 combination is called for. Preferably the scale provides a quantitative indicium proportional to the weight of the magnet(s) 21, magnetic particles and other magnetic debris accumulated thereon in real time. Thus, the system preferably may comprise a closed loop calibration control 36 forming a closed feedback loop 50.

Figure 2A:
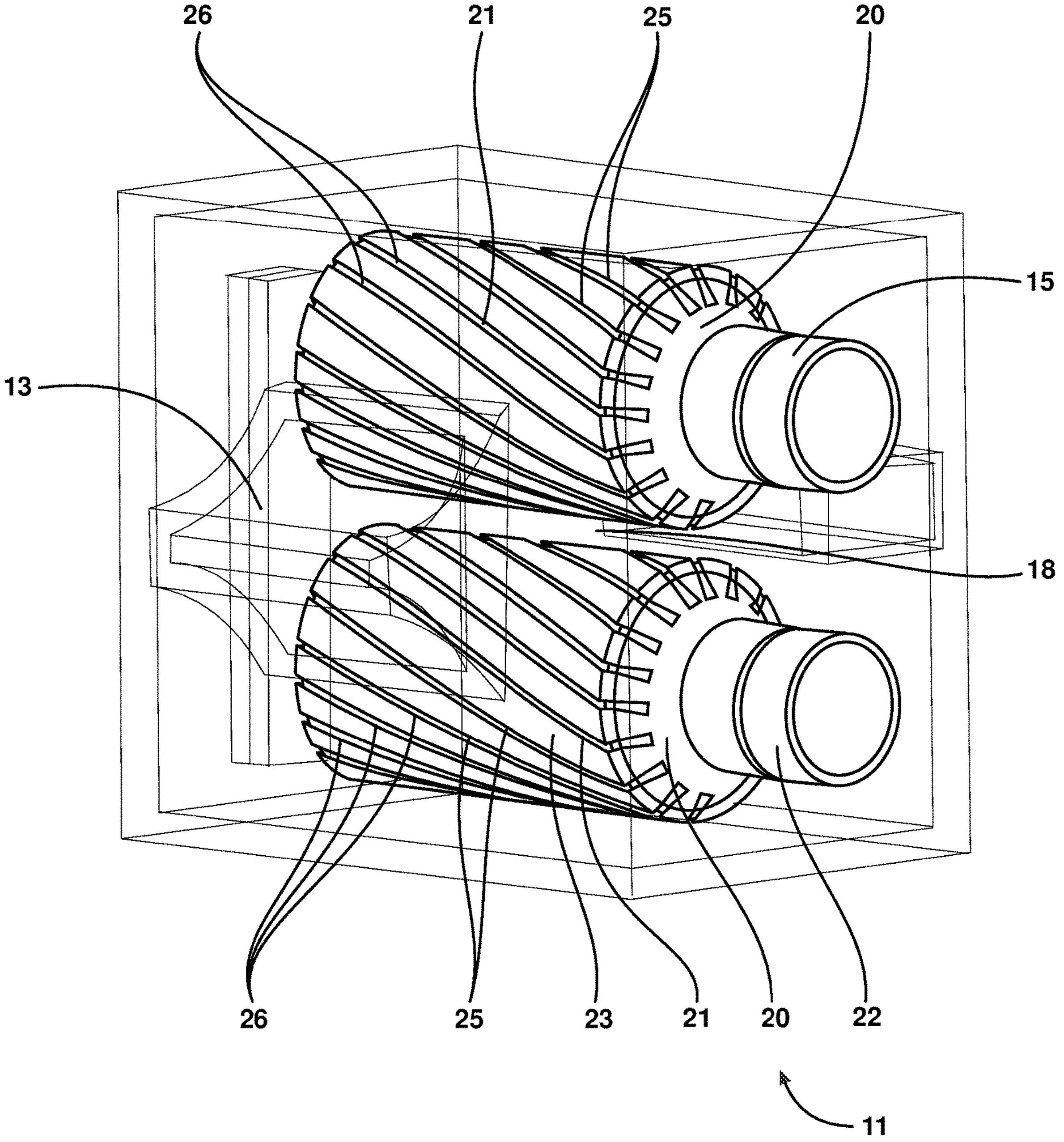
FIGS. 2A and 2B are scale perspective views of an air handler usable with the system of the present invention, having the housing shown as transparent for clarity, the air handler of FIG. 2A showing an inlet of increasing cross section and the air handler of FIG. 2B showing an outlet of constant cross section.
Figure 2B:
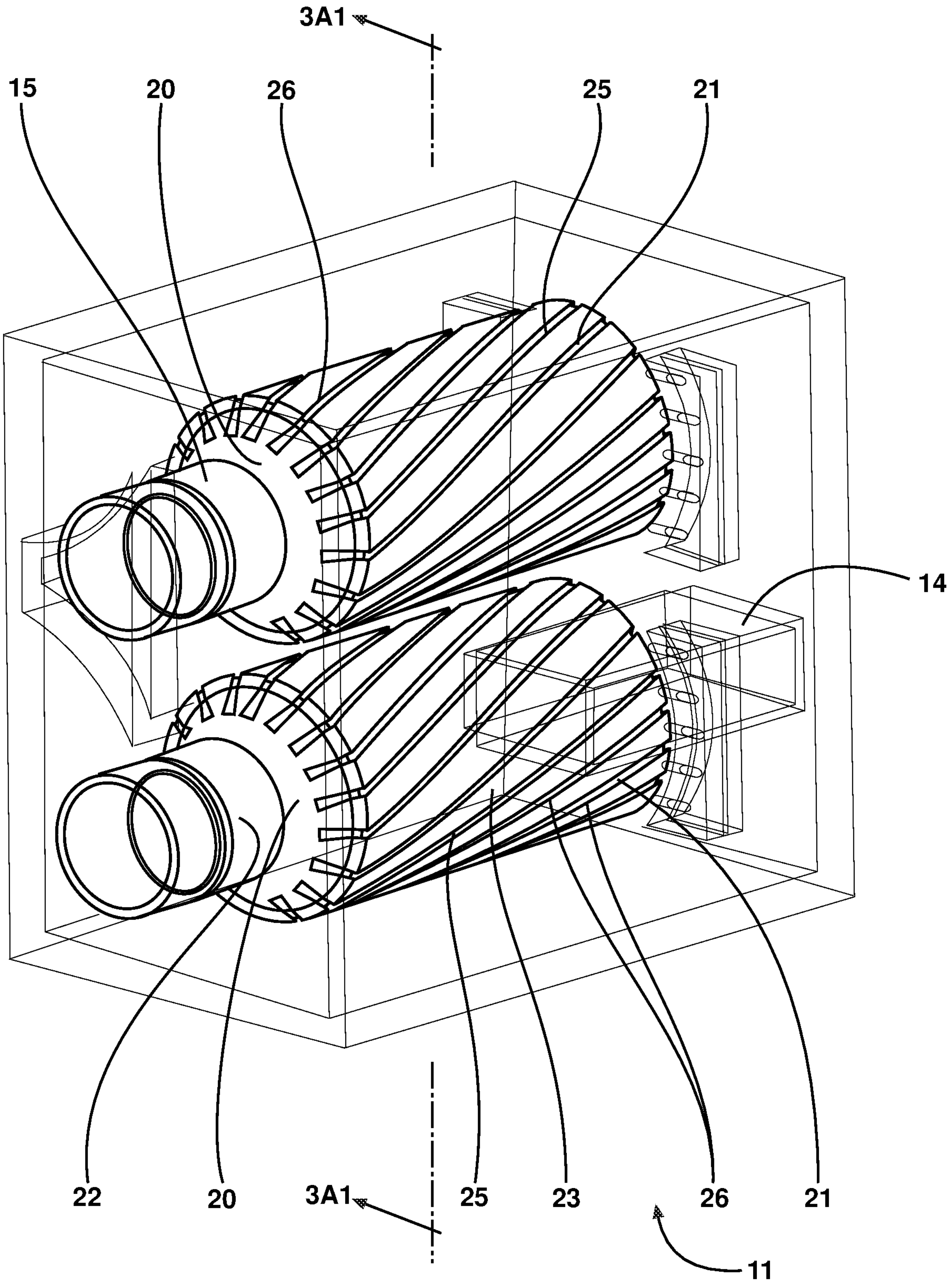
Figure 4:
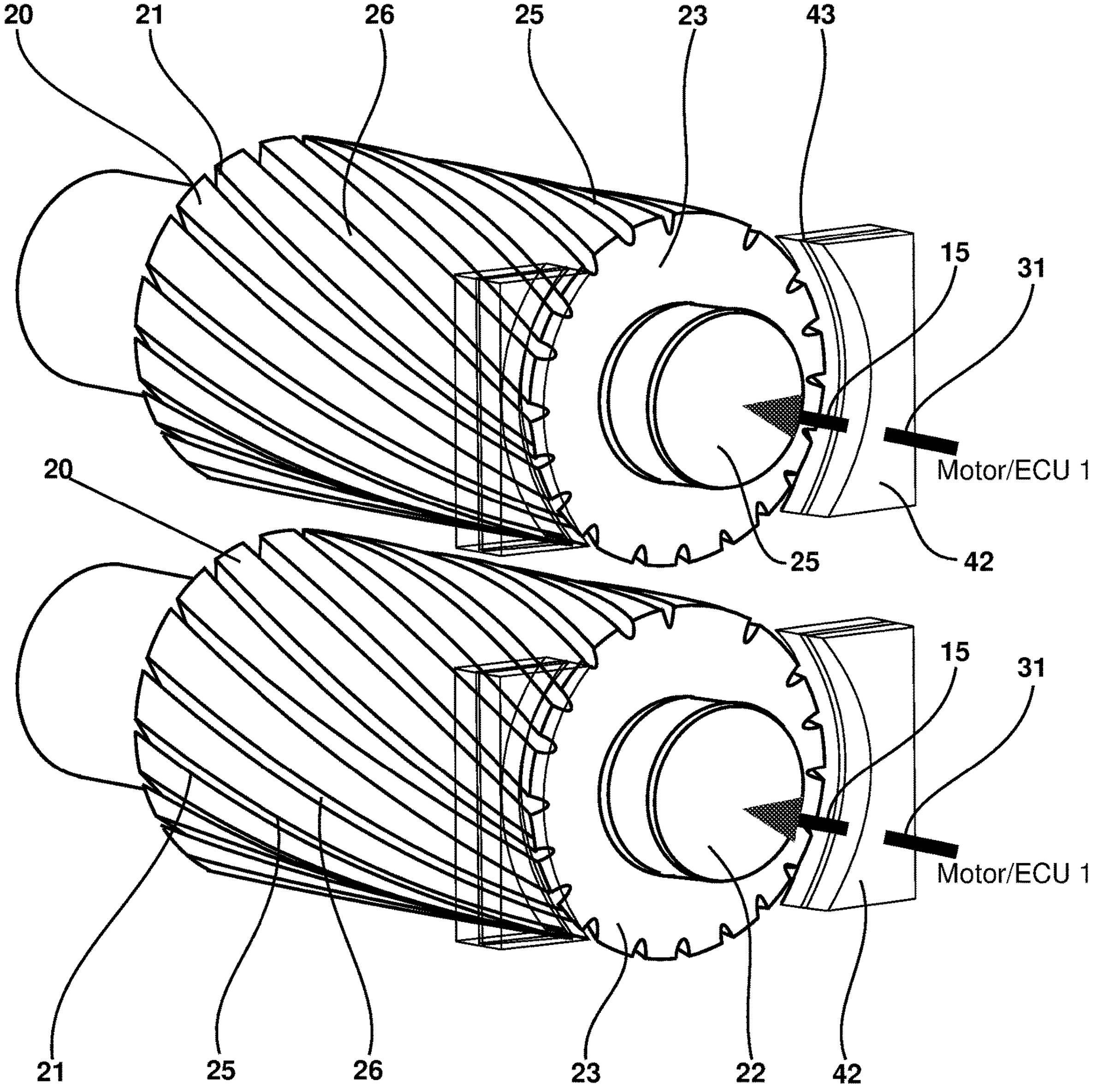
FIG. 4 is a scale perspective view of stacked rollers with axially translatable scraper blades, shown at the start of transverse.
Figure 5A:
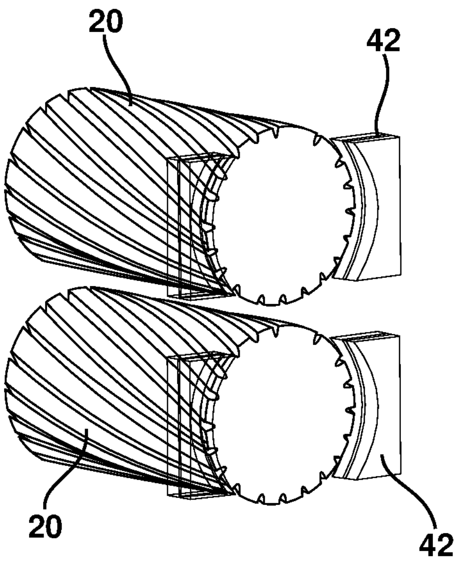
FIGS. 5A-5D are scale perspective views of scraper blades engaged with scraper blades showing the progression of the traverse of the scraper blades parallel to the longitudinal axes of the respective rollers, the enclosure being omitted for clarity.
Figure 5B:
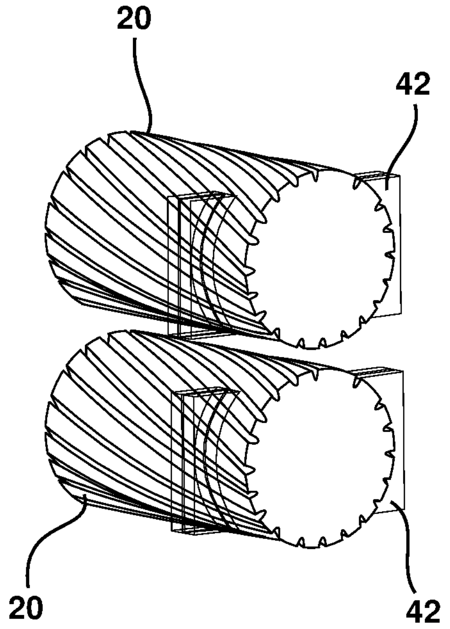
Figure 5C:
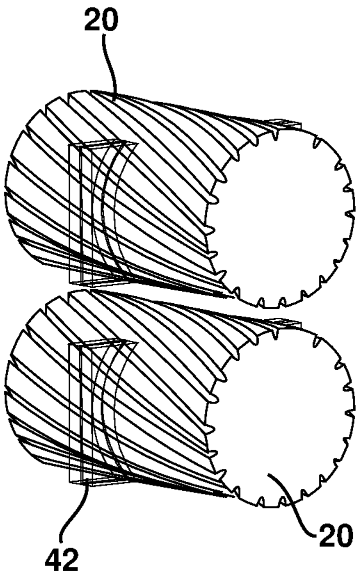
Figure 5D:
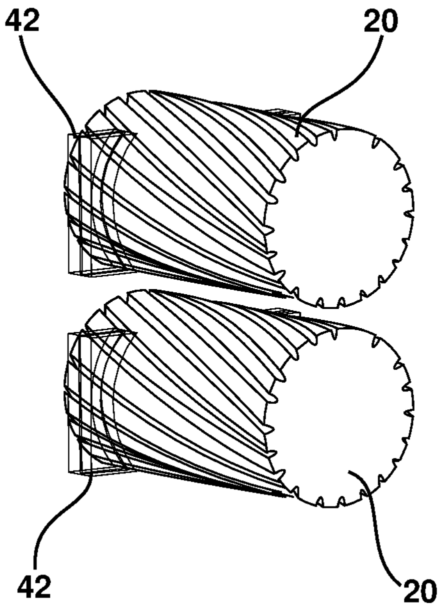

Referring to FIGS. 2A and 2B, the air handler 11 of the present invention comprises an enclosure, at least one inlet 13 and at least one outlet 14 therefor and at least one, preferably at least two, motor driven rollers 20. Examining the invention in further detail, the enclosure may be of any reasonable size and shape for the intended airflow. The rollers 20 are stacked with a gap 18 therebetween, to conserve space and accommodate the desired air flow of the invention. The axes of the rollers 20 define a stack plane. The stack plane preferably has a vector direction perpendicular to the primary direction of air flow and in a degenerate case is perpendicular to the primary direction of air flow.

The enclosure may be a parallelepiped as shown, or may be of a more streamlined design to reduce drag. As shown, the enclosure has a front wall which includes the inlet 13, a rear wall opposed thereto which preferably includes an outlet 14, a first sidewall which has an opening for the end of each roller 20, with two rollers 20 and two stacked respective openings being shown, a second sidewall opposed thereto, and a top and bottom opposed thereto. The specific geometry of the enclosure forms no part of the claimed invention, except as may be specifically claimed below.

The enclosure is preferably made of a paramagnetic or nonmagnetic material to prevent magnetic particles from clinging thereto. As used herein, the adjective nonmagnetic includes materials which are paramagnetic as well as nonmagnetic. Suitable materials for the enclosure include aluminum, brass, austenitic stainless steel, ABS, polycarbonate, acrylic plexiglass, PVC, HDPE and the like.

The inlet 13 is preferably disposed so that its horizontal centerline is coincident the gap 18 between the rollers 20 when vertically stacked. This arrangement is believed to advantageously provide airflow which intercepts more surface area of the rollers 20, thereby increasing particle removal. The inlet 13 may have a first end which mates with the upstream HVAC. The inlet 13 may have a second end which intercepts the first wall of the enclosure. The inlet 13 may diverge to provide increasing cross sectional flow area from the first end to the second end to decrease flow rate and prophetically improve particle capture. If desired, in a variant embodiment, there may be a plurality of stacked inlets 13, one inlet 13 corresponding to each stacked roller 20 in the plurality of roller 20 or one inlet 13 corresponding to each gap 18 between the stacked rollers 20. The width of the inlet 13 may be matched to or slightly less than the width of the respective roller 20 or gap 18 therebetween.

The horizontal centerline of the outlet 14 may likewise be disposed so that its horizontal centerline is coincident the gap 18 between the rollers 20. The outlet 14 may be connected to any vacuum as is known in the art. A conventional fan is believed to be suitable.

It is to be understood that any suitable magnetic surface may be used as a collector for collection, retention and disposal of the magnetic particles. Preferably the surface of the collector is convex, to increase collection area.

Referring collectively to FIGS. 3A1, 3A2, 3B1, 3B2, 3C1 and 3C2 and examining the invention in more detail, the invention preferably includes one, two, three or more rollers 20, with two rollers 20 being shown. Each roller 20 has a longitudinal centerline which may be of any orientation relative to the predominate direction of air flow. Each roller 20 has a first end which is operably connectable to an external motor 15 and a second end opposed thereto. By operably connected, it is meant that each roller 20 may be driven by a dedicated motor 15 or, alternatively, that a single motor 15 may drive plural rollers 20 using a drive train as is known in the art. The particular at least one motor 15 and drive train form no part of the claimed invention, except as may be specifically claimed below.

The motor 15 driven rollers 20 may be driven by AC or DC power, as desired. The voltage supplied to the motors 15 is preferably sufficient to axially rotatably operate the rollers 20 at speeds and with adequate torques in order to capture debris from the air currents as deemed necessary for the particular environment. One of skill will recognize that as debris becomes captured and loaded onto a roller 20, the corresponding voltage required to drive the roller 20 at constant speed or torque will increase. This increase in required voltage, and optionally in torque resistance may be monitored at the data hub 32. Preferentially the voltage and torque are monitored by the data hub 32 in real time. In turn, the data hub 32 may be monitored in real time by an operator 34 or may send alarm signals to the operator 34 as needed.

The rollers 20 may be mounted perpendicular to the predominate direction of air flow, may be in acute angular relation thereto or may even be parallel thereto. Preferably both rollers 20 rotate in the same direction, i.e. both clockwise or both counterclockwise. This arrangement produces a counterflow at the gap 18. Prophetically, the counterflow creates turbulence, which slows and disperses airflow, providing the particles more residence time proximate the rollers 20. Alternatively, the rollers 20 may rotate in opposite directions, as commonly occurs.

Plural rollers 20 may be vertically stacked, as shown, or may be vertically offset in any suitable manner. The rollers 20 are conventionally mounted as is known in the art. One end of each roller 20 extends out of a wall, such as a side wall. Such extensions allow for the rollers 20 to be motor driven in conventional fashion, such as by a stepping motor 15 or other suitable motor 15. It is understood that each roller 20 may have a dedicated motor 15 or one roller 20 may be motor driven and the other roller(s) 20 gear driven from the first roller 20.

The roller(s) 20 have a core 22 and shell 23 construction. The core 22 comprises magnetic, and preferably ferromagnetic material, such as steel. The shell 23 comprises nonmagnetic material, such as described above. The roller 20 is preferably round and cylindrical, although the invention is not so limited. The core 22 and shell 23 are preferably axially concentric and each have a constant cross section, although the invention is not so limited. For example, the rollers 20 may be crowned, hourglass etc. The rollers 20 are preferably of equal width, as taken in the longitudinal direction, and may be of equal or unequal diameters.

One or more grooves 26 or pluralities of grooves 26 may be cut into the shell 23, exposing the subjacent magnetic material of the roller 20. The grooves 26 may be of any suitable geometry, with exemplary and non-limiting spiral grooves 26 being shown. Other suitable geometries for the pluralities of grooves 26 include circumferential, longitudinal, sinusoidal, helical and combinations thereof. If desired, the grooves 26 may be interdigitating, i.e. overlap in the stack plane without touching.

The grooves 26 have two sides, a bottom and a constant cross section. The sidewalls may be mutually parallel, radially oriented, convergent or of any other suitable configuration. The depth of the grooves 26 preferably matches the radial thickness of the thin shell 23 or may be greater than the thickness of the shell 23. The bottom of the grooves 26 may be flat, convex, concave or any other suitable configuration which provides constant cross section. The grooves 26 may subtend 20% to 40% of the surface area of the roller 20. The grooves 26 may be of constant or variable depth and cross section. For example, the grooves 26 may be deeper near the center of the roller 20, as less boundary flow occurs increasing total cfm flow rate.

These grooves 26 are spaced apart by an appropriate distance tailored to the application considering factors such as average particle size, particle density, inlet 13 velocity and magnetic particle concentration. The grooves 26 may be mutually parallel are cut in a spiral pattern such that the rotation of the magnetic cylindrical roller 20 matches the linear motion of the reciprocal teeth 43 on the scraper blades 42. The grooves 26 may be of any suitable geometry, with exemplary and non-limiting spiral grooves 26 being shown.

Referring back to FIG. 1, in a second embodiment the AHPPS may be a current detector. This embodiment has the benefit of being a common reading, and which can be taken directly from the motor 15. A reference current, or null current, is the steady state operating current under no load operation. As used herein, no load operation for any AHPP is the operation at steady state speed with no debris accumulation on the roller 20 or within the air flow chamber. The stall current is the current at which a jam or other catastrophic event occurs. Normal operating current occurs between the null current and stall current.

The normal operating current begins at the null current and increases due to accumulation of debris on the rollers 20. As the required current increases over time, due to debris accumulation, the current detector sends a corresponding signal to the data hub 32. When the current signal is received at the data hub 32, operation proceeds as described above with respect to the first embodiment.

A suitable motor 15 is believed to be rated for about 5 to about 20 amps. A suitable current detector is believed to have a corresponding detector range with a resolution of about 1 milliamp to 10 milliamps. If desired, a noncontacting sensor 31 may be used to monitor either or both of motor 15 current, motor 15 voltage, alternatively or simultaneously, as desired. A 754-OB amp meter, a 773 CAL Milliamp Process Meter or a 87V Multi meter all made by Fluke Corporation of Everett, WA are believed suitable. This embodiment has the benefit of being a direct observation of motor 15 performance.

With continuing reference to FIG. 1, in a third embodiment the AHPP is dynamic and the torque of the motor 15 shaft necessary to achieve the desired rotational speed of the respective roller(s) 20. One of skill will recognize that the output torque of the motor 15 shaft(s) will be substantially equal to the input torque of the corresponding roller shaft(s).

Similar to the preceding AHPPs, the null torque is the initial torque necessary to run at steady state with no debris loading to provide resistance. The stall torque is the maximum torque achieved before shaft lockup.

The normal operating torque begins at the null torque and increases due to accumulation of debris on the rollers 20. As the required torque increases over time, due to debris accumulation, a torque sensor 31 sends a corresponding signal to the data hub 32. When the torque signal is received at the data hub 32, operation proceeds as described above with respect to the first embodiment.

A torque sensor 31 having a resolution of at least 0.1 NM is believed suitable. A TSS400 Shaft-to-Shaft Torque Sensor 31 made by FUTEK of Irvine, CA, coupled with a convention torque gauge or a Norma 6003+ Power Analyzer available from Fluke Corporation of Everett, WA are believed suitable. This embodiment has the benefit of being usable with a clutch intermediate the motor 15 shaft and bearing shaft for emergency shutdown.

In a fourth dynamic embodiment, the AHPP may is bearing temperature. Bearing temperature may be measured at either or both of the motor 15 shaft bearings or the roller bearings. As used herein, bearings include journal bearings and ball bearings. The normal operating temperature begins at the null temperature and increases due to accumulation of debris on the rollers 20. As the required temperature increases over time, due to debris accumulation, a temperature sensor 31 sends a corresponding signal to the data hub 32. When the temperature signal is received at the data hub 32, operation proceeds as described above with respect to the first embodiment.

Preferably the temperature sensor 31 has a resolution of at least 0.1 Celsius degree. A 279 FC True-rms Thermal Multimeter, a 588 Contact & Infrared Thermometer or a 54 II B Data Logging Thermometer all available from Fluke Corporation of Everett, WA are believed suitable as temperature sensors 31. This embodiment has the benefit of being usable to indicate incipient or impending bearing failure, reducing the need for untimely or catastrophic bearing replacement.

Referring back to FIGS. 2A and 2B, in an alternative or additional embodiment, the rollers 20 may be mounted on bearings at each end or a single end as shown. The bearings are operably associated with and may rest upon a weight sensor 31. During operation, as particles are collected on the roller 20, a respective weight sensor 31 monitors particle collection, and communicates with the data hub 32 in real time. This process provides for safe and efficient operation of the HVAC, improving personnel safety.

Similar to the preceding AHPPs, the null weight is the initial weight during operation at steady state with no debris loading. The normal operating weight begins at the null weight and increases due to accumulation of debris on the rollers 20. As the weight increases over time, due to debris accumulation during operation, the weight sensor 31 sends a corresponding signal to the data hub 32. When the weight signal is received at the data hub 32, operation proceeds as described above with respect to the preceding embodiments.

Preferably the weight sensor 31 has a resolution of at least 10 grams, more preferably at least 1 gram. A Model PBK989-CC150, K383-A815 or Model PBK989-AB30 available from Mettler Toledo of Columbus, OH are believed to be suitable. This embodiment has the benefit of being usable as a static and/or dynamic AHPP.

Referring to FIGS. 4, 5A, 5B, 5C and 5D, the present invention may further comprise two or more scraper blades 42 for cleaning particles from the grooves 26 in the roller 20. Two blades 42 spaced 180 degrees out, as shown, three blades 42 spaced 120 degrees out and four blades 42 spaced 90 degrees out are believed to be suitable embodiments. The scraper blades 42 are concave and have teeth 43 complimentary to the grooves 26. The teeth 43 may be comprised of solid, non-magnetic material, such as aluminum or plastic or of dense, bristles, such as nylon, forming teeth 43. These teeth 43 slidably and tightly fit into the grooves 26 of the magnetic cylindrical roller 20. The blades 42 may move radially inward to engage the grooves 26 and radially outward to disengage the grooves 26 and the entire roller 20.

For cleaning and collection of the magnetic particles, the rollers 20 are stopped and preferably power is disconnected. The rollers 20 may be placed in neutral, for manual operation. The blades 42 are advanced parallel to the longitudinal axis LA to scrape particles form the grooves 26 until the entire length of the roller 20 is traversed in the longitudinal direction. It will be apparent to one of skill, that as the blades 42 traverse the length of the roller 20, the roller 20 will rotate to accommodate the spiral and allow the scraper blades 42 to continue in a straight line without deviation in the circumferential direction of the roller 20. Preferably the blades 42 do a bilateral traverse for increased particle collection.

During the traverse, dislodged and loose magnetic particles will fall to the floor of the enclosure. At this point a vacuum may be applied to the outlet 14 and the particles collected for disposal in known fashion. If desired, the enclosure may have a hinged panel construction, allow for easy access to the interior of the enclosure for additional particle collection, routine cleaning and maintenance. This embodiment prophetically has the benefit of simplified construction given that solid rolls are feasible and the outlet 14 performs dual functions.

Figure 6:
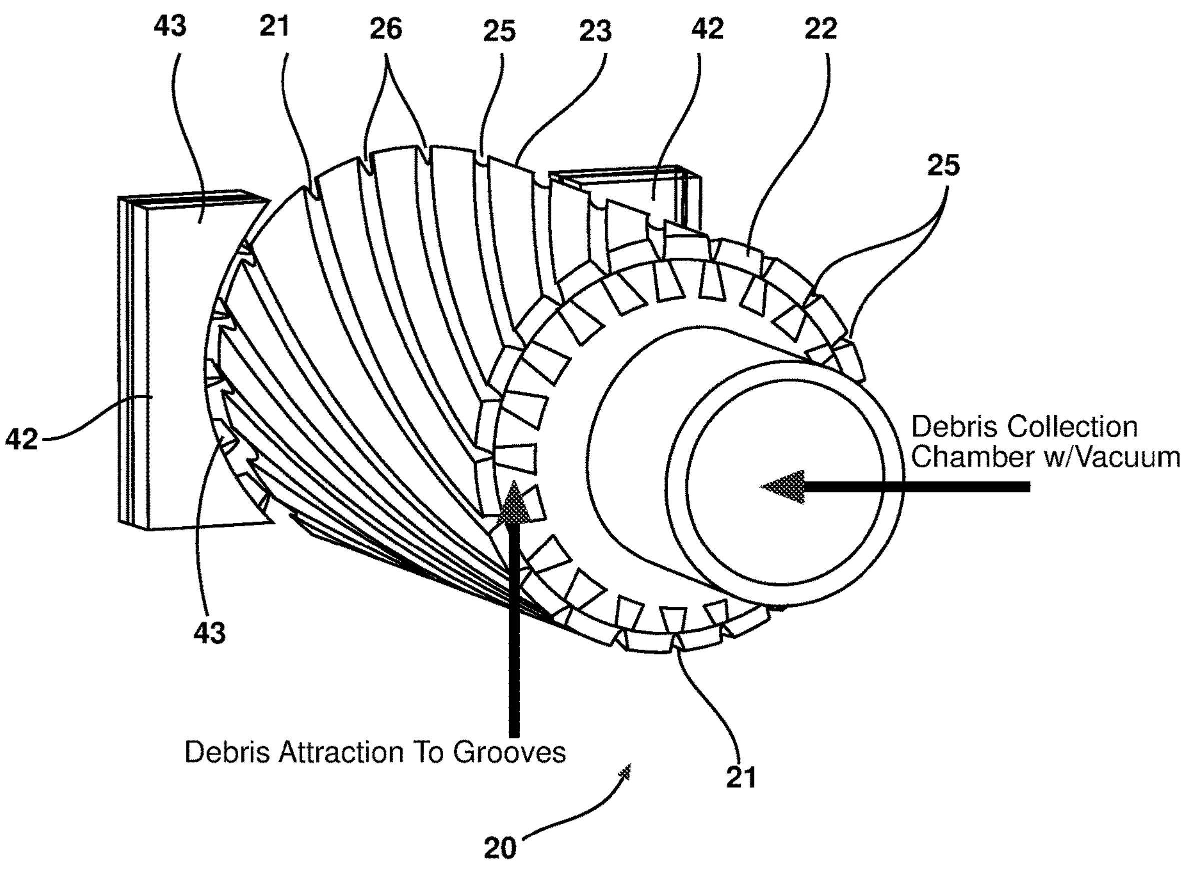
FIG. 6 is a scale perspective view of the one of the rollers of FIG. 5 showing the scraper blade at the end of traverse.

Referring to FIG. 6, in an alternative embodiment the roller 20 may be hollow, with again with a nonmagnetic shell 23 circumscribing an annular wall. In such an embodiment, the grooves 26 are cut through the shell 23 and annular wall and only have two sidewalls with no bottom wall. The annular wall is magnetic and made be made of steel. In such an embodiment, the interior of the hollow roll is in communication with a vacuum. The particles are collected in a vessel which is weighed and in communication with the data hub 32, as described above. During operation, the magnetic particles are continuously collected during operation by collection on the side walls of the grooves 26. Upon reaching the threshold weight, operation is stopped, and the scraper blades 42 traverse the longitudinal length of the roll to dislodge magnetic particles for collection into the interior of the hollow roll. At this point a vacuum may be applied to the end of the roll and the particles collected for disposal in known fashion. This embodiment prophetically has the benefit of a dual air flow system 10—a dedicated outlet 14 for normal operation and a separate vacuum for particle collection during maintenance.

FIG. 6 further illustrates an alternative hollow core 22 and shell 23 roller 20 construction. Instead of or in addition to grooves 26, the nonmagnetic shell 23 may have perforations, i.e. blind holes 27, through the shell 23. The perforations allow for collection of magnetic particles therein, which particles accumulate in the holes 27 due to attraction to the magnetic core 22 material at the bottom of the holes 27. The grooves 26 may intersect in a diamond pattern, holes 27 may optionally be disposed in the centers of the diamonds, grooves 26 and holes 27 may be of equal or unequal size and spacing. Collectively, grooves 26, holes 27, perforations and other access through the nonmagnetic shell 23 to the magnetic core 22 are herein referred to as ports 25.

Figure 7:
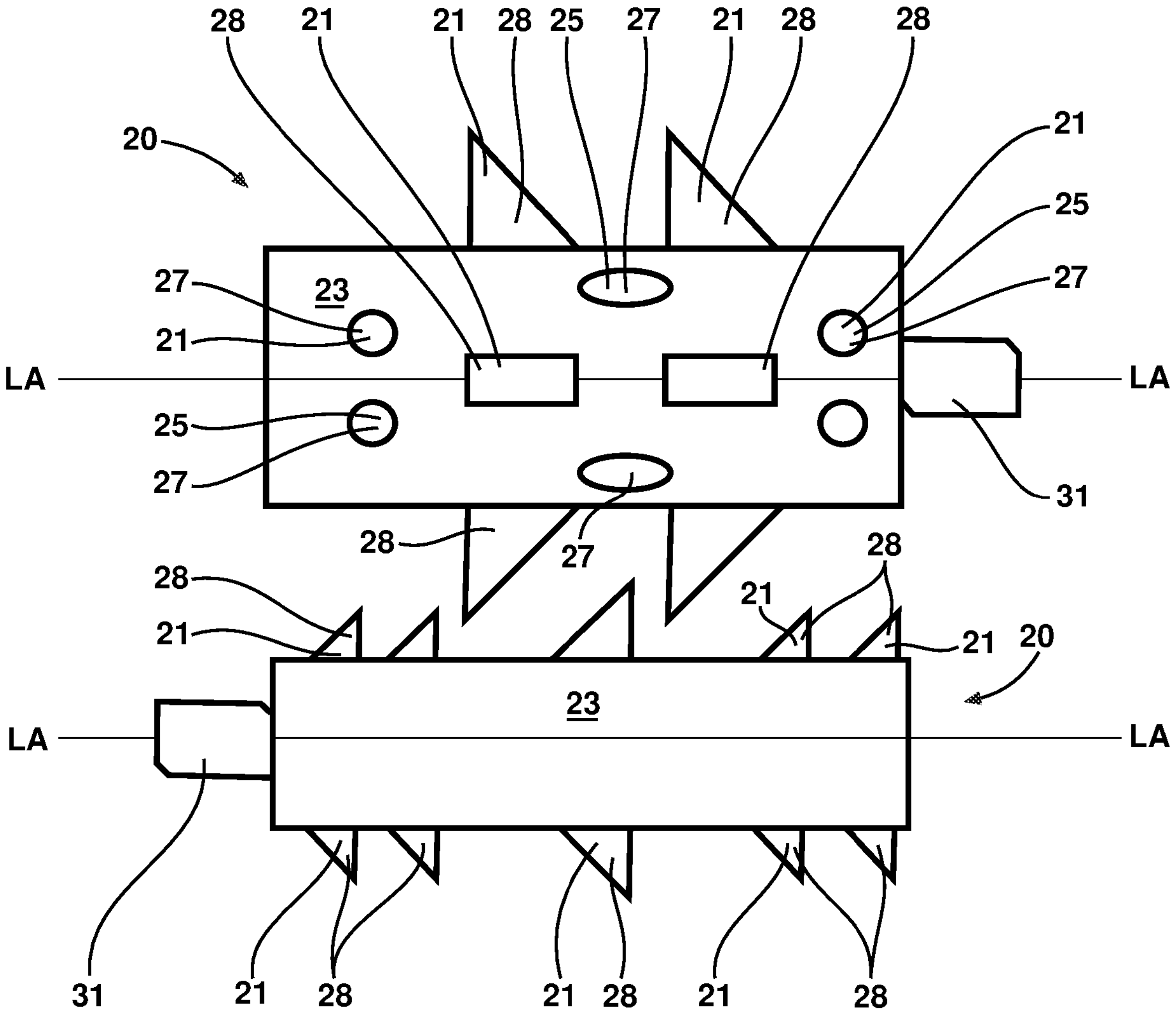
FIG. 7 is a schematic, front elevational view of stacked interdigitating rollers having a gap therebetween, the first roller having radially extending fins and a diameter greater than the second roller, the second roller having radially extending fins and multiply shaped ports.

Referring to FIG. 7, in a variant embodiment the at least one roller 20 may have one or more fins 28 for debris collection. The fins 28 may be used instead of or in addition to the aforementioned grooves 26. The fins 28 may be steel, magnetized as described above with respect to the grooves 26 and/or have a magnetic coating thereon. Metallic particles accumulate during operation of the air handler 11 due to the aforementioned interaction of the rotating fins 28 with the air stream. The fins 28 may have any of the geometries, or combinations of geometries, described above with respect to the grooves 26. The fins 28 extend radially outwardly from a proximal end joined to the surface of the roller 20 to a distal end spaced radially outwardly from the proximal end.

If desired, the fins 28 may be interdigitating, i.e. overlap in the stack plane without touching. The fins 28 may be angled 35 to 55 degrees, and 45 degrees in a degenerate, case relative to the longitudinal axis LA. Such angle is believed to provide air flow interaction without creating undue resistance during rotation. This embodiment has the benefit that fins 28 both create turbulence, increasing interaction with the entrained metallic particles and being easy to clean due to the outwardly extending geometry.

Magnetic particles accumulated from the apparatus may be discarded, or reused as desired. The specific type of and optional recycling of debris forms no part of the invention, except as may specifically be claimed herein.

What is claimed is:

1. A system for removing magnetic particles from a moving air stream, said system comprising:

an air handler having an inlet and an outlet for directing an air stream therethrough, the air stream having a plurality of magnetic particles entrained therein;

at least one magnet disposed internal to said air handler so that said at least one magnet can interact with the air stream to remove magnetic particles therefrom;

a motor operably associated with said at least said magnet to impart movement thereto during operation of said air handler;

at least one air handler performance parameter sensor operably connected to each said at least one magnet, said sensor gathering data from air handler performance parameters selected from the group consisting of weight, current, voltage, torque and temperature and combinations thereof; and a data hub operably connected to each of said at least one air handler performance parameter sensor, the data hub being capable of determining an initial respective value of each said parameter and a respective change in said respective value of each said parameter responsive to and quantitatively indicative of accumulation of magnetic particles on that magnet and being capable of reporting a change in said respective value of each said at least one sensor to an operator.

2. A system according to claim 1 wherein said data hub is capable of reporting said change in said respective value in real time.

3. A system according to claim 2 wherein said data hub is capable of sending an alarm to an operator when a threshold air handler performance parameter is reached.

4. A system according to claim 3 comprising at least two identical magnets and a dedicated air handler performance parameter sensor operably connected to each said magnet.

5. A system according to claim 4 comprising at least two identical magnets and a dedicated air handler performance parameter sensor operably connected to each said magnet.

6. A system according to claim 5 comprising at least two substantially cylindrical, identical axially rotatable magnets.

7. A system according to claim 6 wherein said air handler performance parameter is weight.

8. A system according to claim 6 wherein said air handler performance parameter is torque.

9. A system for removing magnetic particles from a moving air stream, said system comprising:

an air handler having an inlet and an outlet for directing an air stream therethrough, the air stream having a plurality of magnetic particles entrained therein;

at least one motor driven, axially rotatable magnet disposed internal to said air handler so that said at least one magnet can interact with the air stream to remove magnetic particles therefrom;

at least one air handler performance parameter sensor operably connected to each said at least one magnet, said sensor gathering data from air handler performance parameters selected from the group consisting of weight, current, voltage, torque, temperature and combinations thereof; and a data hub operably connected to each of said at least one air handler performance parameter sensor, the data hub being capable of determining an initial respective value of each said parameter and a respective change in said respective value of each said parameter responsive to accumulation of magnetic particles on that magnet and being capable of reporting a change in said respective value of each said at least one sensor to an operator.

10. A system according to claim 9 wherein said at least one magnet comprises a motor driven, axially rotatable roller, said roller having a core and shell construction, said core being magnetic and said shell being nonmagnetic, said shell having plural ports therethrough.

11. A system according to claim 10 wherein said ports comprise spiral grooves extending throughout the axial dimension of said roller.

12. A system according to claim 11 wherein said at least one motor driven, axially rotatable roller comprises a pair thereof and having a gap therebetween, said gap configured to allow airflow therethrough.

13. A system according to claim 12 wherein said pair of axially rotatable rollers have mutually parallel axes defining a stack plane, said stack plane being perpendicular to the intended direction of airflow through said air handler.

14. A system according to claim 13 said axially rotatable rollers both rotate in the same direction.

15. A system for removing magnetic particles from a moving air stream, said system comprising:

an air handler having an inlet and an outlet for directing an air stream therethrough, the air stream having a plurality of magnetic particles entrained therein;

at least one motor driven, axially rotatable roller disposed internal to said air to interact with the air stream to remove magnetic particles therefrom, said roller having a core with a nonmagnetic shell; said shell having at least one of ports therethrough to expose a magnetic core and magnetic fins extending outwardly therefrom;

at least one air handler performance parameter sensor operably connected to each said at least one magnet, said sensor gathering data from air handler performance parameters selected from the group consisting of weight, current, voltage, torque and temperature; and combinations thereof; and a data hub operably connected to each of said at least one air handler performance parameter sensor, the data hub being capable of determining an initial respective value of each said parameter and a respective change in said respective value of each said parameter responsive to accumulation of magnetic particles on that magnet and being capable of reporting a change in said respective value of each said at least one sensor to an operator.

16. A system according to claim 15 comprising a system according to claim 15 wherein said at least one motor driven, axially rotatable roller comprises a pair thereof and having a gap therebetween, said gap configured to allow airflow therethrough, said pair of axially rotatable rollers have mutually parallel axes defining a stack plane, said stack plane being perpendicular to the intended direction of airflow through said air handler.

17. A system according to claim 16 wherein ports comprise interdigitating grooves having a vector dimension in the axial direction.

18. A system according to claim 16 wherein fins comprise interdigitating fins angled 35 to 55 degrees relative to the longitudinal axis of the respective roller.

19. A system according to claim 16 further comprising at least one axially translatable blade associated with a respective roller for engaging and cleaning particles from said grooves.

20. A system according to claim 19 wherein said at least one blade comprises two mutually opposed axially translatable blades.

* * * * *